US007697892B2

(12) United States Patent
Komoriya (10) Patent No.: US 7,697,892 B2
(45) Date of Patent: Apr. 13, 2010

(54) WIRELESS COMMUNICATION SYSTEM, CRADLE APPARATUS, AND PORTABLE DEVICE

(75) Inventor: Yota Komoriya, Tokyo (JP)

(73) Assignee: Sony Corporation (JP)

( * ) Notice: Subject to any disclaimer, the term of this patent is extended or adjusted under 35 U.S.C. 154(b) by 686 days.

(21) Appl. No.: 11/630,046

(22) PCT Filed: May 16, 2005

(86) PCT No.: PCT/JP2005/008903

§ 371 (c)(1),
(2), (4) Date: Dec. 15, 2006

(87) PCT Pub. No.: WO2006/001133

PCT Pub. Date: Jan. 5, 2006

(65) Prior Publication Data

US 2007/0237123 A1 Oct. 11, 2007

(30) Foreign Application Priority Data

Jun. 25, 2004 (JP) .............................. 2004-187409

(51) Int. Cl.
*H04B 7/24* (2006.01)
(52) U.S. Cl. ........................................ 455/39; 370/338
(58) Field of Classification Search .................... 455/39, 455/574; 348/836
See application file for complete search history.

(56) References Cited

U.S. PATENT DOCUMENTS 6,745,008 B1 * 6/2004 Carrender et al. .......... 455/41.1

| | | | |
|---|---|---|---|
| 2001/0013890 A1 * | 8/2001 | Narayanaswami | 348/14.01 |
| 2004/0017519 A1 * | 1/2004 | Sung | 348/836 |
| 2004/0110544 A1 * | 6/2004 | Oyagi et al. | 455/575.1 |
| 2004/0176032 A1 * | 9/2004 | Kotola et al. | 455/41.2 |
| 2004/0198430 A1 * | 10/2004 | Moriyama et al. | 455/556.1 |
| 2006/0219776 A1 * | 10/2006 | Finn | 235/380 |

FOREIGN PATENT DOCUMENTS

| | | |
|---|---|---|
| EP | 1 646 155 A1 | 4/2006 |
| JP | 01-182782 | 7/1989 |
| JP | 07-283755 A | 10/1995 |
| JP | 2000-230978 A | 8/2000 |
| JP | 2001-101140 A | 4/2001 |
| JP | 2002-041502 A | 2/2002 |
| JP | 2004-056711 A | 2/2004 |
| JP | 2004-120263 A | 4/2004 |
| JP | 2004-135119 A | 4/2004 |

* cited by examiner

*Primary Examiner*—Matthew D Anderson
*Assistant Examiner*—David Bilodeau
(74) *Attorney, Agent, or Firm*—Lerner, David, Littenberg, Krumholz & Mentlik, LLP (57) ABSTRACT

A cradle apparatus and a portable device are interconnected employing reflected wave transmission without interfering with an adjacent wireless system or impairing ease of use of the portable device. The cradle is provided with a function of a reflected wave reader and a digital camera is provided with a function of a reflector, whereby communication between the cradle and the digital camera is performed in a non-contact manner. The digital camera modulates a reflected wave of an unmodulated carrier transmitted from the cradle by varying the antenna load impedance in accordance with picked up image data, thereby performing reflected wave transmission. Communication is possible even while the portable device is somewhat apart from the cradle, and the ease of use of the portable device is not impaired even while communication is being performed.

17 Claims, 5 Drawing Sheets

WIRELESS COMMUNICATION SYSTEM, CRADLE APPARATUS, AND PORTABLE DEVICE

TECHNICAL FIELD

The present invention relates to a wireless communication system which enables communication between devices placed at a relatively short distance from each other with low power consumption. In particular, the present invention relates to a backscatter type wireless communication system in which data communication is performed utilizing transmission of an unmodulated carrier from a reflected wave reader and modulation of a reflected wave based on, for example, switching of antenna load impedance on the part of a reflector.

More specifically, the present invention relates to a wireless communication system, a cradle apparatus, and a portable device in which the cradle apparatus and the portable device are interconnected without ease of use of the portable device being impaired. In particular, the present invention relates to a wireless communication system, a cradle apparatus, and a portable device in which the cradle apparatus and the portable device are interconnected in a wireless manner while suppressing interference with other adjacent wireless systems.

BACKGROUND ART

Higher efficiency of command or date transfer, sharing of information resources, and sharing of hardware resources can be accomplished by connecting a plurality of devices to form a network. Further, in recent years, wireless networks are attracting attention as systems that free users from interconnections according to cable systems.

Examples of standard specifications concerning wireless networks include IEEE (The Institute of Electrical and Electronics Engineers) 802.11, HiperLAN/2, IEEE 802.15.3, and Bluetooth communication. In recent years, wireless LAN systems have become inexpensive and PCs have begun to come equipped with a wireless LAN system, resulting in remarkable widespread use of wireless LAN.

Relatively small-scaled wireless communication systems are utilized in homes or the like for data transfer between a host device and a terminal device. Examples of such a host device include stationary household electrical appliances such as a television, a monitor, a printer, a PC, a VTR, and a DVD player. Examples of the terminal device include portable devices in which power consumption is desired to be reduced as much as possible, such as a digital camera, a video camera, a cellular phone, a portable information terminal, and a portable music player. One example of the applications of this type of system is uploading image data picked up by a camera-equipped cellular phone or a digital camera to a PC via a wireless LAN.

By way of example, there has been proposed a digital camera that is advantageous when performing Bluetooth communication favorably (see, for example, Patent Document 1). Specifically, the digital camera includes a case and a shutter button provided on the case, and the shutter button is provided at a left or right edge portion of the upper part of the case. In addition, an antenna for Bluetooth communication is provided inside the case and at the opposite (left or right) edge portion of the upper part of the case.

However, the wireless LAN was originally designed and developed on the assumption that it would be used in computers, and when attached to a portable device, it suffers a problem of power consumption. Many of the wireless LAN cards (IEEE 802.11b) currently on the market have a power consumption of or more than 800 mW (at the time of transmission) and of or more than 600 mW (at the time of reception). This power consumption is a heavy burden to portable devices, which are powered by butteries.

Restricting the use of the wireless LAN capability to short range operation in order to reduce transmission power results only in an approximately 80 percent reduction in power consumption. In particular, transfer from an image input device, such as a digital camera, to an image display device takes the form of communication in which transmission occupies almost all parts of communication, which constitutes an additional reason that a wireless transfer means with low power consumption is desired.

As for the Bluetooth communication, because its transfer rate is low, a maximum of 720 kbps, it is inconvenient for transfer of today's images with improved quality and increased file size as it takes much time.

In contrast, the use of radio transmission employing a reflected wave based on the backscatter system as used in RFID realizes low power consumption in the communication form in which transmission occupies almost all parts of communication between devices, for example.

A wireless communication system based on the backscatter system is constructed of a reflector that transmits data by means of a modulated reflected wave and a reflected wave reader that retrieves the data from the reflected wave from the reflector. At the time of data transfer, the reflected wave reader transmits an unmodulated carrier. On the other hand, the reflector uses, for example, a load impedance operation, such as On/Off of termination of an antenna, to modulate the unmodulated carrier in accordance with data to be transferred, thereby sending the data. Then, the reflected wave reader receives the reflected wave and performs demodulation/decoding thereon, thereby acquiring the transmitted data.

The reflector is constructed of, for example, an antenna for causing an incoming continuous radio wave to be reflected, a circuit for generating transmission data, and an impedance changing circuit for changing the impedance of the antenna in accordance with the transmission data (see, for example, Patent Document 2).

In the reflected wave transmission system, an antenna switch for changing the load impedance of the antenna (i.e., modulating the reflected wave) is generally formed by a gallium arsenide IC, and its power consumption is at or lower than tens of microwatts. As for the average power at the time of data transfer, data transfer is possible with or less than 10 mW in the case of a delivery confirmation system and with tens of microwatts in the case of a unidirectional transfer. This shows an overwhelming superiority in performance as compared with the average power consumptions of common wireless LANs (see, for example, Japanese Patent Application No. 2003-291809). Therefore, even in the case where a terminal device for information storage is mounted on a battery-powered portable device such as a digital camera, significant prolongation of the battery life can be achieved by saving the power consumption at the time of data transfer.

In the reflected wave transmission system, which is a low power consumption wireless communication system and which employs a reflected wave, the reflected wave reader needs to be transmitting the unmodulated carrier when data is transmitted from a tag. Therefore, the unmodulated carrier transmitted from the reflected wave reader may cause a problem of interference with other wireless communication systems. Further, in order to receive the reflected wave with sufficient reception intensity, the reflected wave reader needs to transmit the unmodulated carrier with a relatively large power, resulting in a large power consumption during transmission of the unmodulated carrier. Still further, in the case where the 2.4 GHz band, which falls within the ISM (Industry Science Medical) band, is utilized for the reflected wave transmission system, interference with other adjacent radio standards, such as IEEE 802.11b/g and Bluetooth, may occur, resulting in communication interference with each other.

A pedestal-like connection stand, called a "cradle", on which a device is to be placed is sometimes used for a portable device, such as a digital camera or a PDA (Personal Digital Assistant), that does not have a means of direct connection to a PC. The cradle has a point of electrical connection with a portable device mounted thereon and a means of direct connection to a PC, which enables data exchange between the two devices (see, for example, Patent Document 3). In general, the cradle and the PC are serially connected with each other via a USB (Universal Serial Bus) cable or the like. Many cradles have the capability to charge the battery of a portable device as well. Placing the cradle at a position close to the PC results in an increased affinity between the portable device and the PC, and the convenience of the portable device is expected to be improved by the intermediacy of the cradle.

However, in the case where the point of connection between the cradle and the portable device is of the contact type, the point of connection suffers a maintenance problem. Further, in the case of a digital camera, operation of the digital camera, such as photographing, is cumbersome while it is placed on the cradle. In other words, the digital camera might decrease in the ease of use depending on its design.

[Patent Document 1]
Japanese Patent Laid-open No. 2004-56711
[Patent Document 2]
Japanese Patent Laid-open No. Hei 01-182782
[Patent Document 3]
Japanese Patent Laid-open No. 2004-135119

DISCLOSURE OF THE INVENTION

Problems to be Solved by the Invention

An object of the present invention is to provide an excellent wireless communication system based on the backscatter system, which enables excellent data communication utilizing the transmission of the unmodulated carrier on the part of the reflected wave reader and the modulation of the reflected wave based on, for example, switching of the antenna load impedance on the part of the reflector.

A further object of the present invention is to provide an excellent wireless communication system, cradle apparatus, and portable device in which the cradle apparatus and the portable device can be interconnected without the ease of use of the portable device being impaired.

A still further object of the present invention is to provide an excellent wireless communication system, cradle apparatus, and portable device in which the cradle apparatus and the portable device can be interconnected in a wireless manner while suppressing interference with other adjacent wireless systems.

Means for Solving The Problems

The present invention has been designed in view of the above-described problems and is a wireless communication system for performing reflected wave transmission employing modulation of a reflected wave of a radio wave, the system including: a portable device configured to superimpose data on a reflected wave of a received radio wave and thereby transmit the data; and a cradle apparatus configured to transmit a carrier wave, receive a reflected wave of the carrier wave, and demodulate the data transmitted from the portable device.

Note that the term "system" as used above refers to a logical collection of devices (or function modules that implement specific functions) regardless of whether or not all of the devices or function modules are contained in a single housing.

The wireless communication system according to the present invention aims to realize reduction in power consumption for a communication form in which communication is performed between devices placed within a relatively short range and transmission occupies almost all parts of the communication, and involves performance of radio transmission employing modulation of a reflected wave based on a backscatter system as used in RFID. The RFID system itself is widely known in the art as an example of wireless communication means which can be suitably employed within a short range.

For example, as communication means for transferring data stored in a portable device, such as image data picked up by a digital camera, to a host such as a PC, a reflected wave transmission system can be employed. However, in order to start data transfer, the host needs to wait for reception while transmitting a carrier wave (an unmodulated carrier) for generating a reflected wave, which results in excessive power consumption while the host is on standby. Further, in the case where the 2.4 GHz band, which falls within the ISM (Industry Science Medical) band, is utilized, there is a problem in that the radio wave that is transmitted continuously while waiting for reception may interfere with other adjacent wireless systems.

Meanwhile, it is possible to connect the portable device such as a digital camera with the host device such as a PC by the intermediacy of a cradle. There are, however, problems concerning the maintenance of a point of connection between the cradle and the portable device and the ease of use of the portable device while it is placed on the cradle.

As such, according to the present invention, the cradle is provided with a function of a reflected wave reader as used in the reflected wave transmission system and the portable device such as a digital camera is provided with a function of a reflector, whereby communication between the cradle and the portable device is achieved in a non-contact manner. For example, the digital camera is able to perform reflected wave transmission by changing the antenna load impedance in accordance with picked up image data and thereby modulating the reflected wave corresponding to an unmodulated carrier transmitted from the cradle apparatus. Using the reflected wave transmission for the communication between the portable device and the cradle enables communication between the cradle apparatus and the portable device even in a situation where they are somewhat distant from each other, and therefore, even while they are communicating with each other, the ease of use of the portable device is not impaired.

The cradle apparatus may be so configured as to start transmission of the unmodulated carrier at the time when the digital camera is placed upon the cradle apparatus. In this case, the unmodulated carrier is transmitted only while there is a need to transfer an image from the digital camera to the host device (e.g., a PC) connected to an interface of the cradle apparatus. This suppresses interference with other radio standards and contributes to reduction in power consumption of the cradle apparatus.

While the digital camera is placed on the cradle apparatus, communication distance will be as short as several centimeters; therefore, the unmodulated carrier may be transmitted with a low power. Meanwhile, when the digital camera has been removed from the cradle apparatus, switching may be carried out so that the unmodulated carrier is transmitted with a high power. In such a manner, it is possible to control transmission power in accordance with the communication distance as required. This suppresses the interference with other radio standards and contributes to the reduction in power consumption of the cradle apparatus. Moreover, it is possible to transfer the image data to a display apparatus by way of a cable interface (e.g., a USB cable) of the cradle apparatus while operating the digital camera near at hand.

Further, it is possible to additionally provide the cradle apparatus having the function of a reflected wave reader of the reflected wave transmission system with a charging capability. Still further, in the case of a non-contact type charging capability, the physical contact between the cradle apparatus and the digital camera can be avoided completely, resulting in additionally improved ease of maintenance.

Still further, it may be so arranged that a contact type interconnection is adopted while the digital camera is placed on the cradle apparatus and the reflected wave transmission system is adopted instead only when the digital camera has been removed from the cradle apparatus. In this case also, it is possible to inhibit unnecessary transmission of the unmodulated carrier and suppress the interference with other radio standards, and reduction in power consumptions while the cradle apparatus is waiting for reception is achieved.

Effect of the Invention

The present invention provides an excellent wireless communication system, cradle apparatus, and portable device in which the cradle apparatus and the portable device can be interconnected without the ease of use of the portable device being impaired.

In addition, the present invention provides an excellent wireless communication system, cradle apparatus, and portable device in which the cradle apparatus and the portable device can be interconnected in a wireless manner while suppressing the interference with other adjacent wireless systems.

According to the present invention, the carrier wave is transmitted from the cradle apparatus and the reflected wave modulated by and transmitted from the portable device is demodulated, whereby the portable device is able to communicate with the cradle in a non-contact manner even while it is placed on the cradle apparatus. Moreover, transmission of the unmodulated carrier with a high power is possible when it is separated from the cradle apparatus; therefore, while it performs communication upon the cradle apparatus, exclusive use of a radio band and interference with other wireless communication systems can be avoided, and at the same time, power saving is achieved. Further, it is possible to extend the communication distance as necessary so that the operation of an image pickup apparatus is possible while holding it in hand.

Other objects, features, and advantages of the present invention will become apparent from the following, more detailed description of the present invention based on an embodiment of the present invention described below and the accompanying drawings.

BRIEF DESCRIPTION OF THE DRAWINGS

[FIG. 1]

[FIG. 2]

[FIG. 3]

[FIG. 4]

[FIG. 5]

DESCRIPTION OF REFERENCE NUMERALS 101 cradle apparatus
102 communication function section
103 communication control section
104 push button
105 interface section
106 audio/video processing function section
107 audio/video output function section
201 image pickup apparatus
202 communication function section
203 communication control section
204 image pickup function section
205 data storage section
301 host device

BEST MODE FOR CARRYING OUT THE INVENTION

Hereinafter, an embodiment of the present invention will be described in detail with reference to the accompanying drawings.

The present invention aims to enable, in a communication form in which communication is performed between devices placed within a relatively short range and transmission occupies almost all parts of the communication, control of devices such as electrical appliances, transfer of large volume data such as image data, and mutual communication each by means of low power consumption communication operation, and involves performance of radio transmission utilizing a reflected wave based on a backscatter system as used in RFID.

The RFID system itself is widely known in the art as an example of wireless communication means which can be suitably employed only within a short range. Examples of methods of communication between a tag and a reader/writer include an electromagnetic coupling type, an electromagnetic induction type, and a radio frequency communication type. Of these types, the present invention is concerned with the radio frequency communication type employing a microwave in the 2.4 GHz band, for example.

For example, as a communication means for transferring image data picked up by a digital camera to a PC, a reflected wave transmission system can be employed. However, in order to start data transfer, a host needs to wait for reception while transmitting a carrier wave for generating a reflected wave, which results in excessive power consumption while the host is on standby. Further, in the case where the 2.4 GHz band, which falls within the ISM band, is utilized, there is a problem in that the radio wave that is transmitted continuously while waiting for reception may interfere with other adjacent wireless systems.

Meanwhile, it is possible to connect the digital camera and the PC by the intermediacy of a cradle. There are, however, problems concerning the maintenance of a point of connection between the cradle and the portable device and the ease of use of the portable device when it is placed on the cradle.

As such, the present invention provides the cradle with a function of a reflected wave reader and a portable device such as a digital camera with a function of a reflector as used in the reflected wave transmission system, thereby enabling communication between the cradle and the portable device in a non-contact manner. For example, the digital camera is able to perform reflected wave transmission by changing the antenna load impedance in accordance with picked up image data and thereby modulating the reflected wave corresponding to an unmodulated carrier transmitted from the cradle. Using the reflected wave transmission for the communication between the portable device and the cradle enables communication between the cradle and the portable device even in a situation where they are somewhat distant from each other, and therefore, even while they are communicating with each other, the ease of use of the portable device is not impaired.

Hereinafter, as an embodiment of the present invention, an operation will be described in which removal of the image pickup apparatus from the cradle is detected by a push button, which is an "image pickup apparatus recognition function section" mounted on the cradle, being turned off, the cradle transmits the unmodulated carrier, and the image pickup apparatus transmits image data.

Figure 1A:
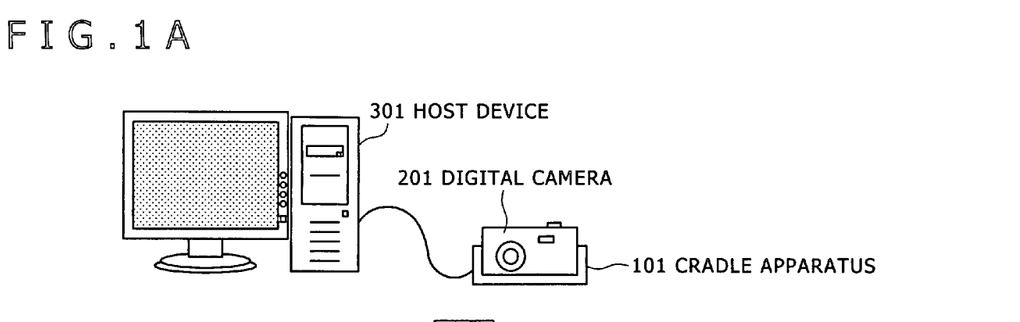
FIGS. 1A and 1B are diagrams illustrating an exemplary configuration of a system according to one embodiment of the present invention.
Figure 1B:
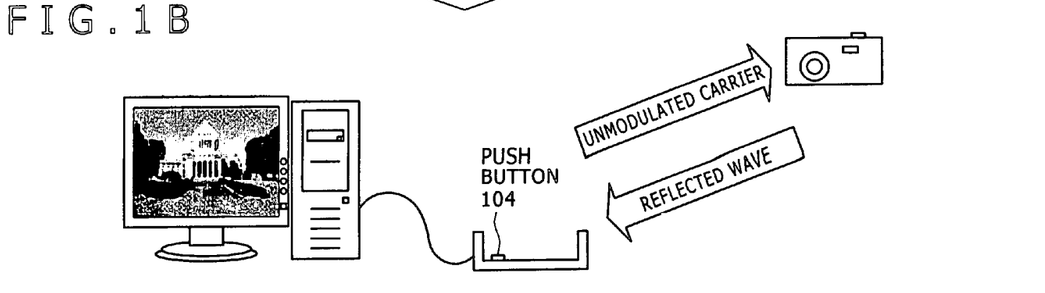

FIGS. 1A and 1B are diagrams illustrating an exemplary configuration of a system according to one embodiment of the present invention. The illustrated system is constructed of a cradle apparatus 101, an image pickup apparatus 201 such as a digital camera for picking up and accumulating moving images or still images, and a host device 301 such as a PC for displaying/outputting image data or processing images.

In the example as illustrated in FIG. 1A, the image pickup apparatus 201 is placed on the cradle apparatus 101. In this situation, a push button 104, which is the "image pickup apparatus recognition function section" mounted on the cradle apparatus 101, is in the ON state as it is being depressed.

Meanwhile, in the example as illustrated in FIG. 1B, a user has removed the image pickup apparatus 201 from the cradle apparatus 101. In this situation, the push button 104 is in the OFF state, and the unmodulated carrier is transmitted from the cradle apparatus. In connection with the unmodulated carrier, the image pickup apparatus 201 changes the load impedance of an antenna in accordance with image data to be transmitted and transmits the reflected wave. The cradle apparatus 101 demodulates the reflected wave and transfers the acquired image data to the host device 301. Then, the host device 301 displays/outputs an image sent from the image pickup apparatus 101 on a display screen on a screen. Alternatively, the image may be printed out via a printer (not shown) or transferred to another host device connected to a common network.

Figure 2:
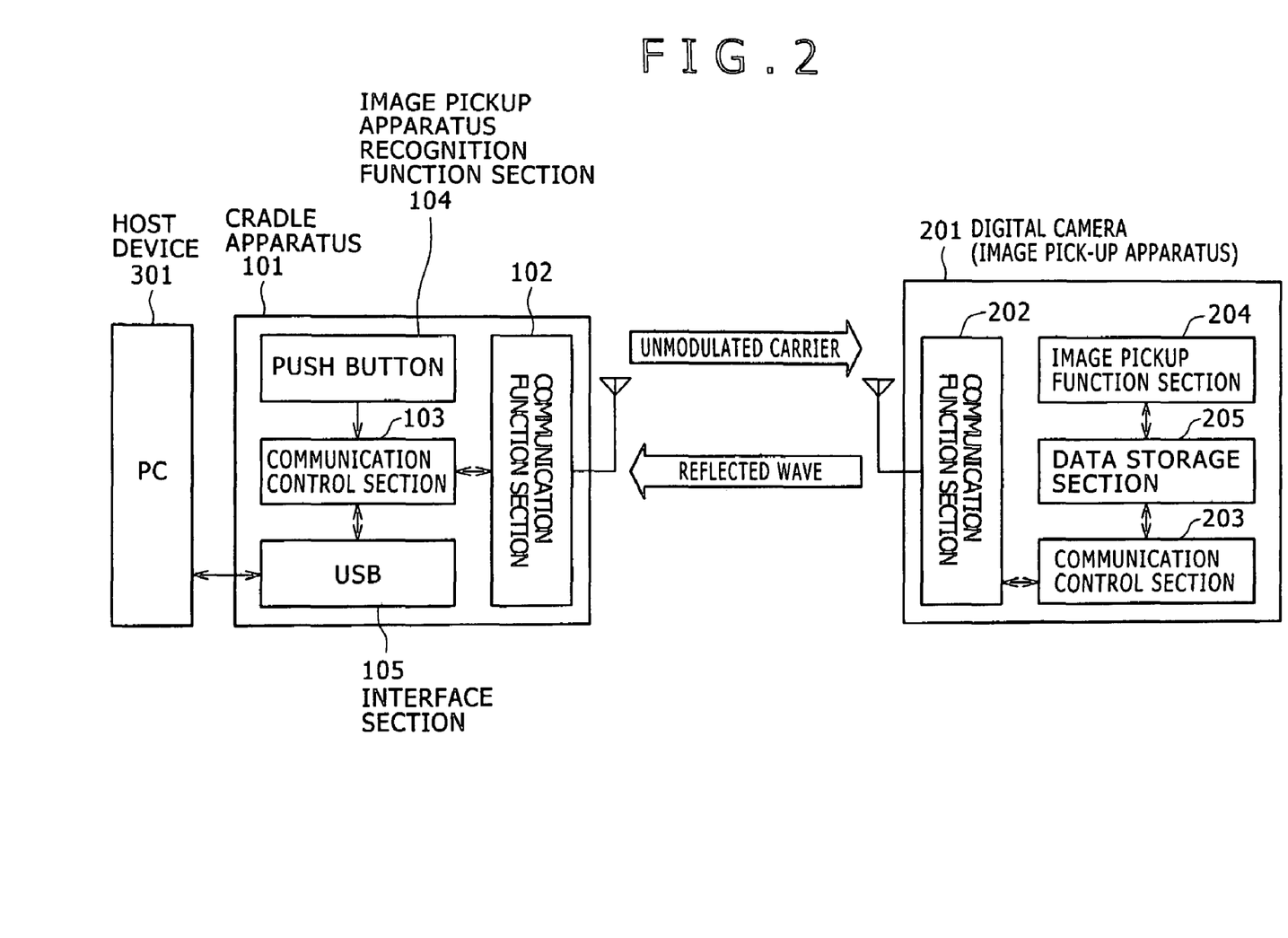
FIG. 2 is a diagram illustrating a configuration of a system for data transfer between a cradle apparatus 101, an image pickup apparatus 201, and a host device 301.

FIG. 2 illustrates a configuration of a system for data transfer between the cradle apparatus 101, the image pickup apparatus 201, and the host device 301.

The cradle apparatus 101 includes a communication function section 102, a communication control section 103, the image pickup apparatus recognition function section 104, and an interface section 105.

In the present embodiment, the image pickup apparatus recognition function section 104 is formed by the push button. For example, when the image pickup apparatus 201 is placed on the cradle apparatus 101, the push button 104 enters the ON state, whereas when the image pickup apparatus 201 is removed from the cradle apparatus 101, the push button 104 enters the OFF state. This is imparted to the communication control section 103. Alternatively, the image pickup apparatus recognition function section 104 may be constituted, for example, by a weight sensor that recognizes, based on weight, that the image pickup apparatus 201 has been placed on the cradle apparatus 101 or by a bus monitor that detects disconnection of a power supply line or a communication line.

The communication function section 102 performs transmission and reception of radio signals in connection with the image pickup apparatus 201. In the present embodiment, the reflected wave transmission system is adopted for data transfer in connection with the image pickup apparatus 201, and the communication function section 102 behaves as a reflected wave reader.

The interface section 105 implements an interface protocol in connection with the host device 301 and is used to transfer data acquired from the image pickup apparatus 201 to the host device 301. In the present embodiment, the interface section 105 is formed by a USB interface. This is not, however, essential to the present invention. For example, the interface section 105 may be a network interface such as an Ethernet interface or an IEEE 1394 interface. Alternatively, it may implement other cable or wireless communication systems.

The image pickup apparatus 201 includes a communication function section 202, a communication control section 203, and a data storage section 205 as well as an image pickup function section 204 for picking up the image data such as moving or still images and performing image processing.

The image pickup apparatus 201 is a digital camera, but it may alternatively be a digital video camera for picking up video or an image. Further, it may be an audio recorder including an audio recording function section for handling audio data instead of image data, or a PDA including a data processing function section for handling other types of computer data or other types of portable devices. Data handled by the apparatus 201 is stored in the data storage section 205. The data storage section 205 may be a fixed storage device internally mounted in the image pickup apparatus 201 or a removable portable medium such as a memory stick.

The communication function section 202 receives and transmits a radio signal in connection with the cradle apparatus 101. In the present embodiment, the reflected wave transmission system is adopted for data transfer between the communication function section 202 and the cradle apparatus 101 (as mentioned previously); therefore, the communication function section 202 behaves as a reflector.

The communication function section 202 receives to-be-transmitted image data read by the communication control section 203 from the data storage section 205 and, based on data values, turns an antenna switch connected to an antenna on and off, thereby varying the antenna load impedance to modulate the reflected wave. For example, when data represents "1", the switch is turned on so that the antenna is terminated with an antenna load of 50 ohms. Meanwhile, when data represents "0", the switch is turned off so that the antenna is left open and reflects an incoming radio wave. By this variation of the antenna load impedance due to the turning on and off of the antenna switch, data transmission is achieved with the reflection of the unmodulated carrier sent from the cradle apparatus 101. The reflected wave signal thus obtained is equivalent to an ASK modulated wave.

The communication function section 102 on the cradle apparatus 101 side transmits the unmodulated carrier and also receives the reflected wave from the image pickup apparatus 201. The reflected wave received is demodulated and passed to the host device 301 via the communication control section 103 and the host interface section 105. In this manner, data communication from the image pickup apparatus 201 to the cradle apparatus 101 is performed.

In the above-described embodiment, the host device is a PC. However, this is not essential to the present invention. For example, the host device may alternatively be a television receiver capable of displaying/outputting a received image on a display or a printer that produces a printed copy of an image.

The communication function section 102 of the cradle apparatus 101 may be configured to provide a response, such as ACK (Acknowledgement) or NACK (Negative Acknowledgement), to the image pickup apparatus 201. The communication function section 102 also may be configured to perform downlink data transmission (i.e., data transmission to the image pickup apparatus 201) in order to transmit information from the host device 301 to the image pickup apparatus 201, for example. In this case, for ease of detection on the image pickup apparatus 201 side, the communication function section 102 may perform radio data transmission with ASK modulation.

Similarly, in order to receive the response or data from the cradle apparatus 101, the communication function section 202 of the image pickup apparatus 201 may be configured to receive radio data subjected to the ASK modulation by demodulating it, for example.

While low bit rate modulation systems, such as ASK and BPSK, are generally employed for uplink transmission, i.e., from the reflector to the reflected wave reader, this is not essential to the present invention. Multilevel modulation systems with a higher bit rate, such as QPSK and 8-PSK modulation, can be implemented by, when modulating the reflected wave, providing phase difference to the reflected wave on a signal path along which the reflected wave passes both ways in addition to the load impedance operation such as the termination of the antenna. For example, Japanese Patent Application No. 2003-352223, which has already been assigned to the present applicant, discloses a backscatter communication system in which the QPSK modulation is adopted.

Figure 5:
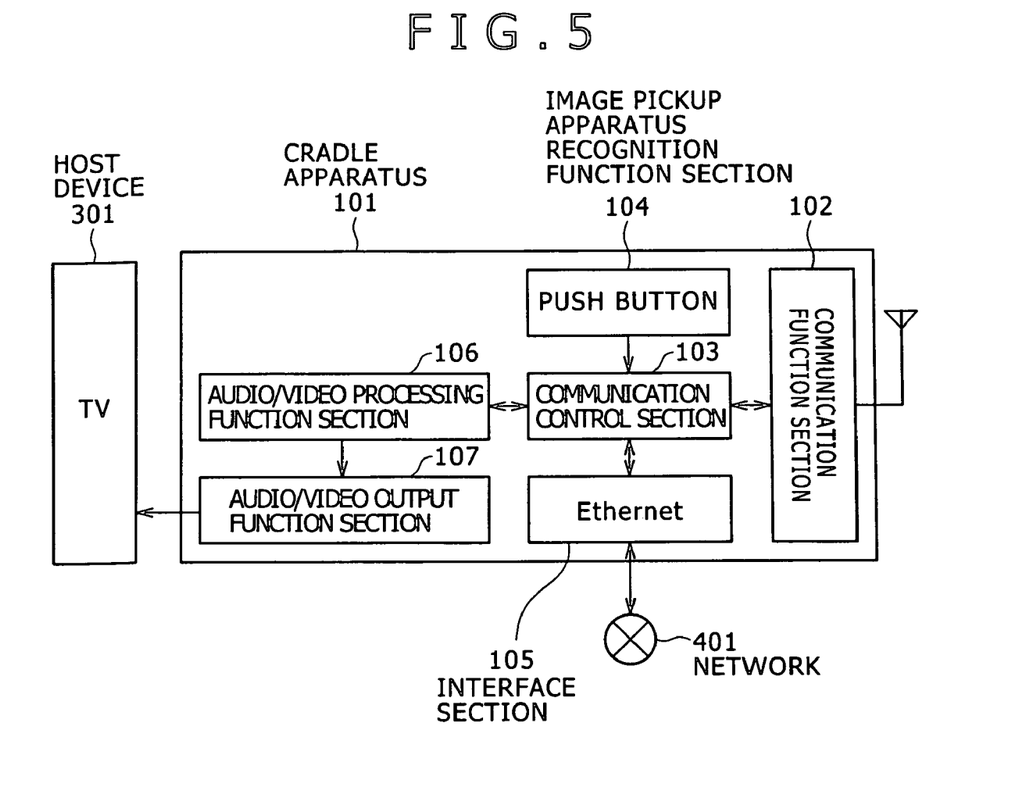
FIG. 5 is a diagram illustrating an exemplary variant of the cradle apparatus as illustrated in FIG. 2.

FIG. 5 illustrates another exemplary configuration of the cradle apparatus 101. The cradle apparatus 101 as illustrated in this figure is different from that of FIG. 2 in that the interface section 105 for establishing connection with the host device 301 is constituted by a network interface for connection with a network 401, such as Ethernet (registered trademark). In addition, the cradle apparatus 101 as illustrated in this figure further includes an audio/video processing function section 106 for decoding video/audio data in an MPEG format or the like received via the communication function section 102 and an audio/video output function section 107 having a video/audio output terminal or the like for outputting the decoded video/audio data to a TV receiver or the like.

Figure 3:
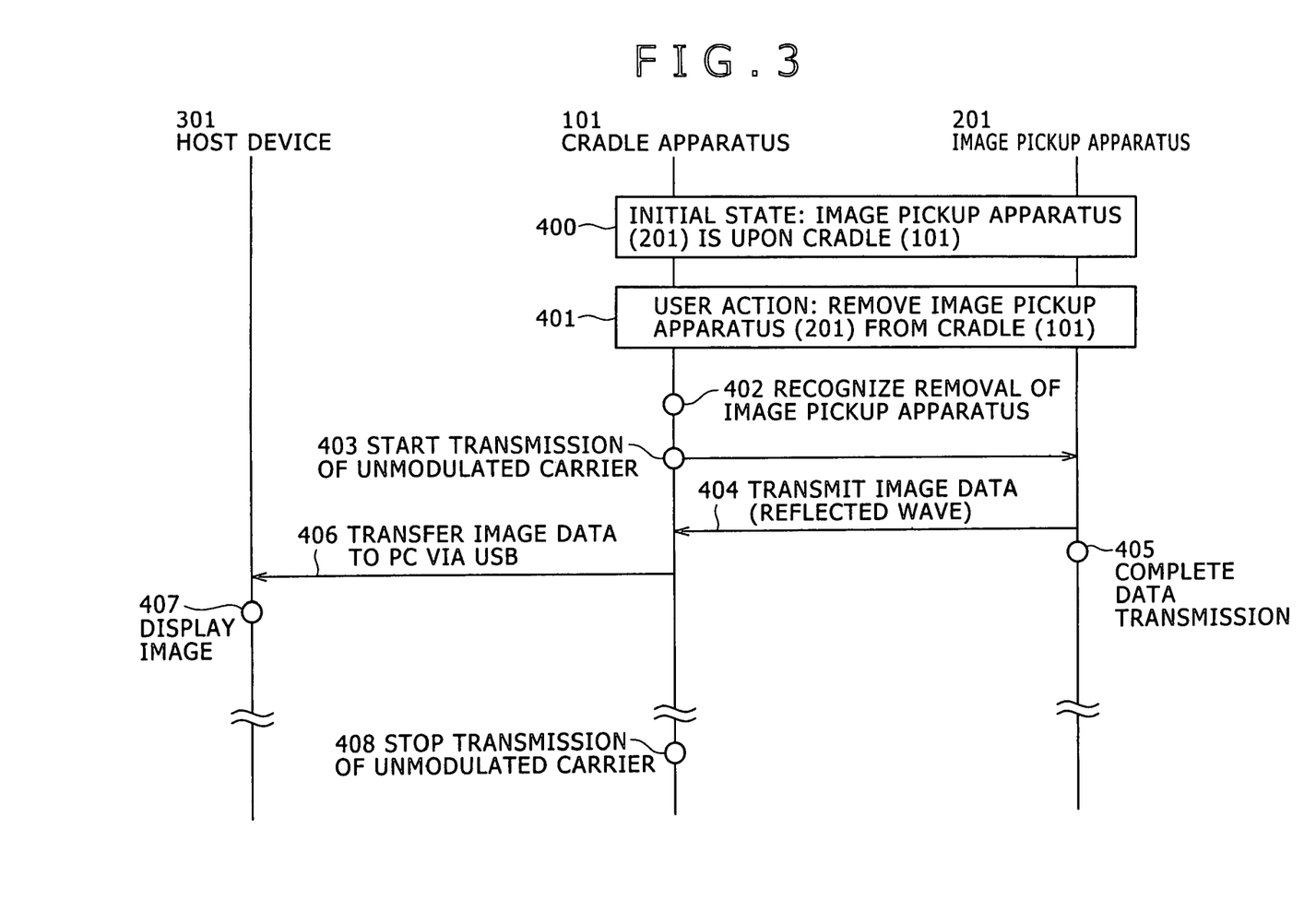
FIG. 3 is a diagram illustrating an exemplary communication sequence in the data transfer system as illustrated in FIG. 2.

FIG. 3 illustrates an exemplary control sequence for the cradle apparatus 101, the image pickup apparatus 201, and the host device 301 in the data transfer system as illustrated in FIG. 2.

In FIG. 3, a state in which the image pickup apparatus 201 is placed on the cradle apparatus 101 is assumed as an initial state, and the figure illustrates a sequence when a user removes the image pickup apparatus 201 from the cradle apparatus 101 and starts the transmission of the unmodulated carrier. It is also assumed that the host device 301 displays an image transferred thereto.

400: The image pickup apparatus 201 is being placed on the cradle apparatus 101.

401: The user removes the image pickup apparatus 201 from the cradle apparatus 101.

402: The push button 104, which is the image pickup apparatus recognition function section 104 on the cradle apparatus 101, enters the OFF state, which is notified to the communication control section 103.

403: The communication control section 103 controls the communication function section 102 so that the communication function section 102 transmits the unmodulated carrier.

404: In the image pickup apparatus 201, which receives the unmodulated carrier, the communication control section 203 modulates, in accordance with the image data stored in the data storage section 205, the reflected wave by varying the load impedance of the antenna of the communication function section 202, for example, and performs data transmission.

405: The transmission of the image data is completed.

406: The communication function section 103 of the cradle apparatus 101 transfers the received image data to the PC, which is the host device 301, via the interface section 105 and a USB cable.

407: In the PC, the corresponding image is displayed on the screen.

408: After a predetermined time elapses, the cradle apparatus 101 stops the transmission of the unmodulated carrier.

In the present embodiment, the image pickup apparatus 201 performs data transmission by receiving the unmodulated carrier and modulating the reflected wave. Note that a request for permission for the data transmission may be issued to the cradle apparatus 101 before the data transmission, and that the data transmission may be started after recognizing a response thereto. Note that, in this case, the communication function section 102 of the cradle apparatus 101 needs to have a capability to perform the ASK modulation for transmission in order to transmit a transmission permission signal, whereas the communication function section 202 of the image pickup apparatus 201 needs to have a capability to subject a received radio wave to ASK detection, for example, to perform data demodulation in order to receive the transmission permission signal.

Also note that the data communication may be communication using packets, and that the cradle apparatus 101 may be configured to return an Ack response for each packet.

Figure 4:
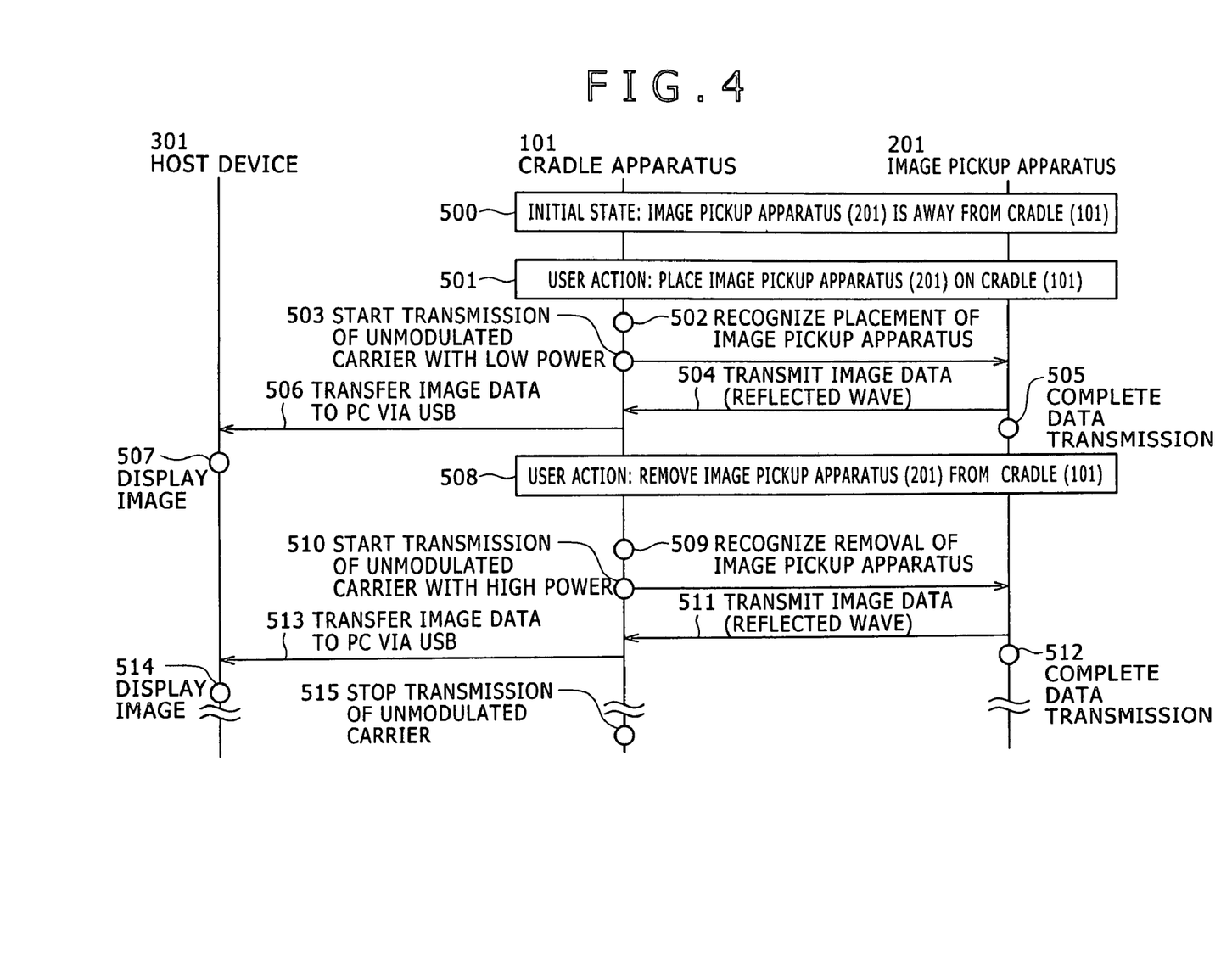
FIG. 4 is a diagram illustrating an exemplary communication sequence in the data transfer system as illustrated in FIG. 2.

FIG. 4 illustrates an exemplary communication sequence in which a state in which the image pickup apparatus 201 is apart from the cradle apparatus 101 is assumed as the initial state, the unmodulated carrier is transmitted with a low power for a short-distance communication when the user has placed the image pickup apparatus 201 on the cradle apparatus 101, and the unmodulated carrier is transmitted with a high power for a long-distance communication when the user has removed the image pickup apparatus 201 from the cradle apparatus 101. It is also assumed that the host device displays the image transferred thereto as with the case of FIG. 3.

500: The image pickup apparatus 201 is apart from the cradle apparatus 101.

501: The user places the image pickup apparatus 201 on the cradle apparatus 101.

502: The push button, which is the image pickup apparatus recognition function section 104 on the cradle apparatus 101, enters the ON state, which is notified to the communication control section 103.

503: The communication control section 103 controls the communication function section 102 so that the communication function section 102 transmits the unmodulated carrier with a low power for the short-distance communication.

504: In the image pickup apparatus 201, which has received the unmodulated carrier, the communication control section 203 modulates, in accordance with to-be-transmitted image data read from the data storage section 205, the reflected wave by varying the load impedance of the antenna of the communication function section 202, for example, and transmits the data in the form of a reflected wave signal.

505: The transmission of the image data is completed.

506: The communication function section 103 of the cradle apparatus 101 transfers the image data to the PC, which is the host device 301, via the interface section 105 and the USB cable.

507: The PC displays the received image data on the screen.

508: The user removes the image pickup apparatus 201 from the cradle apparatus 101.

509: The push button, which is the image pickup apparatus recognition function section 104 of the cradle apparatus 101, enters the OFF state, which is notified to the communication control section 103.

510: The communication control section 103 controls the communication function section 102 so that the communication function section 102 transmits the unmodulated carrier with a high power for the long-distance communication.

511: In the image pickup apparatus 201, which has received the unmodulated carrier, the communication control section 203 modulates, in accordance with to-be-transmitted image data read from the data storage section 205, the reflected wave by varying the load impedance of the antenna of the communication function section 202, for example, and transmits the data in the form of a reflected wave signal.

512: The transmission of the image data is completed.

513: The communication function section 103 of the cradle apparatus 101 transfers the image data to the PC, which is the host device 301, via the interface section 105 and the USB cable.

514: The PC displays the received image data on the screen.

515: After a predetermined time elapses, the cradle apparatus 101 stops the transmission of the unmodulated carrier.

INDUSTRIAL APPLICABILITY

The present invention has been described above in detail referring to a specific embodiment. It is obvious, however, that those skilled in the art are able to modify or alter the above-described embodiment in various manners without departing from the scope of the present invention.

In the present specification, one embodiment of the present invention has been described with reference to an exemplary case where the reflected wave transmission system is employed for connection between a portable device, such as a digital camera, and a cradle apparatus that intermediates between the portable device and a host device, such as a PC, to establish connection therebetween. However, this is not essential to the present invention.

The application of the present invention can produce a similar effect even in the case where a medium other than the reflected wave transmission is employed to connect the portable device with the cradle apparatus, for example.

Further, the application of the present invention can produce a similar effect even in the case where a pair of devices, other than a pair of a portable device and a cradle apparatus, are connected employing the reflected wave transmission system.

In short, the above description of the present invention is only illustrative, and the description of the present application should not be interpreted to be restrictive. For determination of the scope of the present invention, the description of the appended claims needs to be considered.

The invention claimed is:

1. A cradle apparatus configured to function as an intermediary between a portable device and a host device, said cradle apparatus comprising:
   transmission means for transmitting a carrier wave;
   receiving means for receiving from the portable device a reflected wave of the transmitted carrier wave and demodulating data transmitted from the portable device;
   interface means for performing communication with the host device;
   a receptacle configured to receive the portable device; and
   portable device reception recognition means for recognizing whether or not the portable device is being received by said receptacle, wherein
   said transmission means controls transmission of the carrier wave based on a result of the recognition.

2. The cradle apparatus according to claim 1, wherein said cradle apparatus transfers the data received from the portable device via said receiving means to the host device via said interface means.

3. The cradle apparatus according to claim 1, wherein the cradle apparatus transmits data received from the host device via said interface means toward the portable device via said transmission means employing the carrier wave.

4. The cradle apparatus according to claim 1, wherein
   said transmission means transmits the carrier wave in response to reception of the portable device by said receptacle.

5. The cradle apparatus according to claim 1, wherein
   said transmission means transmits the carrier wave in response to removal of the portable device from said receptacle.

6. The cradle apparatus according to claim 1, wherein
   said portable device reception recognition means is formed by a switch configured to detect placement of the portable device on said receptacle.

7. The cradle apparatus according to claim 1, wherein
   said portable device reception recognition means is formed by a weight sensor configured to detect a weight of the portable device placed on said receptacle.

8. The cradle apparatus according to claim 1, further comprising
   a bus interface configured to electrically connect with the portable device received on the receiving surface, wherein
   said portable device reception recognition means is formed by a bus monitor configured to monitor a signal on said bus interface.

9. The cradle apparatus according to claim 1, wherein
   said interface means is formed by a cable or wireless network interface.

10. A cradle apparatus configured to function as an intermediary between a portable device and a host device, the cradle apparatus comprising:
    transmission means for transmitting a carrier wave;
    receiving means for receiving, from the portable device a reflected wave of the transmitted carrier wave and demodulating data transmitted from the portable device;

interface means for performing communication with the host device; and communication control means for stopping transmission of the carrier wave by said transmission means in response to absence of reception by said receiving means of the reflected wave from the portable device continuing for a predetermined time.

11. The cradle apparatus according to claim 10, wherein said interface means is formed by a USB interface.

12. The cradle apparatus according to claim 10, further comprising charging means for charging a battery of the portable device.

13. A cradle apparatus configured to function as an intermediary between a portable device and a host device, the cradle apparatus comprising:

transmission means for transmitting a carrier wave;

receiving means for receiving from the portable device a reflected wave of the transmitted carrier wave and demodulating data transmitted from the portable device;

interface means for performing communication with the host device;

video/audio data processing means for decoding video or audio data received via said receiving means; and video/audio data output means for outputting the decoded video or audio data to an outside.

14. A wireless communication apparatus that performs reflected wave communication employing modulation of a reflected wave of a carrier wave, the reflected wave being caused by a reflector, the apparatus comprising:

transmission means for transmitting the carrier wave;

receiving means for performing a process of receiving the reflected wave of the transmitted carrier wave, the reflected wave being caused by the reflector;

communication control means for controlling transmission of the carrier wave by said transmission means in accordance with a situation of the reflector;

a receptacle configured to receive the reflector; and portable device reception recognition means for recognizing whether or not the reflector is being received by said receptacle, wherein said communication control means controls transmission of the carrier wave based on a result of the recognition.

15. The wireless communication apparatus according to claim 14, wherein said communication control means causes the carrier wave to be transmitted in response to reception of the reflector by said receptacle.

16. The wireless communication apparatus according to claim 14, wherein said communication control means causes the carrier wave to be transmitted in response to removal of the reflector from said receptacle.

17. A wireless communication apparatus that performs reflected wave communication employing modulation of a reflected wave of a carrier wave, the reflected wave being caused by a reflector, the apparatus comprising:

transmission means for transmitting the carrier wave;

receiving means for performing a process of receiving the reflected wave of the transmitted carrier wave, the reflected wave being caused by the reflector; and communication control means for stopping transmission of the carrier wave by said transmission means in response to absence of reception by said receiving means of the reflected wave from the reflector continuing for a predetermined time.

* * * * *